United States Patent [19]

Alexander

[11] Patent Number: 5,290,334
[45] Date of Patent: Mar. 1, 1994

[54] APPARATUS FOR BATCH PREHEATING AND POLLUTION ABATEMENT IN GLASS MANUFACTURE

[75] Inventor: Jeffery C. Alexander, Newbury, Mass.

[73] Assignee: Edmeston AB, Vastra Frolunda, Sweden

[21] Appl. No.: 945,722

[22] Filed: Sep. 21, 1992

[51] Int. Cl.$^5$ ............ C03B 3/02; B01D 50/00; F27D 13/00
[52] U.S. Cl. ..................... 65/335; 65/27; 55/342; 55/350.1; 55/482; 55/523; 414/165; 432/14; 432/16; 432/17; 96/27
[58] Field of Search ............ 65/27, 335; 55/107, 55/129, 140, 146, 478, 479, 482, 523, 485, 342, 350.1; 414/147, 165; 432/14, 16, 17

[56] References Cited

U.S. PATENT DOCUMENTS

| | | | |
|---|---|---|---|
| 3,728,094 | 4/1973 | Bowman | 65/27 |
| 4,144,359 | 3/1979 | Zahedi et al. | 427/39 |
| 4,308,036 | 12/1981 | Zahedi et al. | 55/6 |
| 4,338,113 | 7/1982 | Hohman et al. | 65/27 |
| 4,374,652 | 2/1983 | Zahedi et al. | 55/6 |
| 4,505,723 | 3/1985 | Kahedi et al. | 55/117 |
| 4,542,000 | 9/1985 | Alexander et al. | 423/244 |
| 4,668,489 | 5/1987 | Alexander et al. | 423/240 |

OTHER PUBLICATIONS

Miller et al, "Batch Pretreatment Process Technology . . .", U.S. Environmental Protection Agency Report No. EPA/600/2-85/073, National Technical Information Service, 1985.
"Inka Emission Control", Edmeston GmbH, published before Sep. 21, 1991.
Sakhuja et al, "Fluidized Beds for Glass Batch Preheating", 41st Conf. on Glass Problems. Nov. 18-19, 1980.
Leimkühler, "The preheating of raw material for glass furnaces", Glass Technology 1989.
Larsson, "Particulate emission control and raw material preheating", Edmeston AB, Summer 1992.
"The Edmeston Emission Control System", Edmeston GmbH, published before Sep. 21, 1991.
Holmlund, "Process Description: FLÄKT Flue gas cleaning plant . . . ", Fläkt, 1988.
"EFB System for Glass Furnace Particulate Emission Control", Edmeston Materials System Engineering, published before Sep. 21, 1991.

Primary Examiner—W. Gary Jones
Assistant Examiner—Steven P. Griffin
Attorney, Agent, or Firm—Burns, Doane, Swecker & Mathis

[57] ABSTRACT

A method and apparatus for glass manufacture is described having batch preheating and reduced pollution emission. The apparatus includes two modules containing pelletized glass and/or cullet. One module functions as a pelletized glass preheater, and the other as a filter for removing pollution emissions from furnace exhaust gases. The modules are switchable, such that the preheating module can be converted to a filter module, and the filter module converted to a preheating module, thus allowing periodic cleaning and routine maintenance.

12 Claims, 4 Drawing Sheets

APPARATUS FOR BATCH PREHEATING AND POLLUTION ABATEMENT IN GLASS MANUFACTURE

BACKGROUND OF THE INVENTION

Glass manufacture involves the mixing of various batch ingredients, generally including silica sand, dry powders, granular oxides, carbonates, cullet (i.e., broken and/or recycled glass), and other raw materials (depending on the desired type of glass) and heating them to a temperature of about 1500° C., wherein they become molten and acquire a homogeneous nature. In general, substantial quantities of heat are required for the melting process, this heat generally supplied by combustion of fossil fuels. Because of the relatively poor heat transfer from the hot flue gases to the pool of molten glass, exhaust gas temperatures from the process are usually quite high, in spite of various types of heat recovery equipment employed. Also, pollutants of various types are emitted from the melting process along with the exhausted flue gases.

Two areas of improvement to the basic glass manufacturing process are desirable, namely (1) better energy efficiency, which can be achieved by preheating batch materials using exhaust gas heat with corresponding reductions in fuel requirements, or alternatively, more glass can be made with the same energy input to the melting process; and (2) reduced pollution emissions, wherein various types of gas absorption and/or dust filtration systems can be implemented to satisfy government regulations. The prior art has long investigated improvements in these two areas, and as a result, improvements have been implemented in glass manufacturing facilities in various ways in both production and pilot plants.

The present invention relates to a novel means of achieving both of the above improvements in one system and to the novel arrangement which achieves a functioning system incorporating the improvements.

With respect to better energy efficiency, the glass industry has always been concerned with the energy efficiency of the glass melting process, and has routinely implemented equipment for preheating of combustion air with waste heat from exhaust gases. For over 35 years, interest has also existed for preheating of batch materials. Initial interest was directed more towards presintering the glass batch to promote certain chemical reactions between the glass making materials, as opposed to utilizing waste heat per se. The prior art includes a large variety of methods for heating glass batches, utilizing both direct and indirect flue gas contact and batches in raw powder or agglomerated form.

Preheating of glass batch is desirable for three major reasons:

(1) Improved overall thermal efficiency of the glass melting process utilizing waste heat from exhaust gases. About half of the theoretical energy needed to produce container glass from conventional glass-making raw materials is required to heat the raw materials up to 750° C.

(2) Reduced volatilization and resulting pollutants as a consequence of lowering melting temperatures and prereaction of batch materials.

(3) Faster and more uniform melting, especially where agglomerated batch is utilized.

With respect to pollution capture, the nature and amounts of pollution emissions from glass melting furnaces vary considerably within the glass industry, depending upon the type of glass and production method used. Generally, pollutants fall into two general categories, particulate and gaseous. Particulate pollutants can be ash components in the fuel, carryover of batch material, r products of condensation of material volatilized from the glass melt. The latter is the most prevalent and the primary particulate from soda-lime glass furnaces is $Na_2SO_4$ resulting from Na and $SO_2$ volatilized from the glass melt. Particulate emissions from glass furnaces can be reduced somewhat by reducing temperature and as a result volatilization from the surface of the molten glass. The use of preheated glass batch permits a lowering of the furnace temperature and in itself decreases particulate emissions.

Particulate material from glass melting furnaces is extremely difficult to capture owing to its small size, typically 0.2–0.7 $\mu$m. Generally, electrostatic forces are required to capture particles of such small size. In fact, electrostatic precipitators have become the glass industry standard for capture of particulate matter.

Gaseous emissions from soda-lime furnaces include sulfur and nitrogen oxides, with sulfur oxides resulting primarily from sulfur components in the batch material and nitrogen oxides resulting from oxidation of $N_2$ contained in combustion air. Conventional technology for reduction of $SO_2$ emissions are lime based wet scrubbers. Both these and electrostatic precipitators are add-on devices to the glass manufacturing process which carry significant penalties to the production economics.

Conventional equipment for nitrogen oxide emission reduction has not yet found widespread use. A lowering of furnace temperature should result in reduced nitrogen oxide emissions, so batch preheating would have a beneficial effect here also.

Batch preheating combined with pollution reduction is disclosed in U.S. Pat. No. 4,338,113, relating to a direct/indirect heat exchanger, wherein hot flue gases are directly contacted with durable granular material (such as gravel) in a filter bed. Heated granules are transported to a mixing drum where they are contacted with batch materials, thereby heating the batch materials and cooling the granules. Cooled granules are returned to the filter bed.

The prior art has recognized the potential for simultaneous pollution reduction with batch preheating, but not only from source reduction, as mentioned above. Generally, it has been suggested to use batch preheating in schemes where exhaust flue gases are brought into direct contact with batch materials. Then the batch, whether in raw, loose form or agglomerated form, is expected to function as a mechanical collection site for particulate pollutants. Also, certain components of the glass batch (typically soda ash for soda-lime glass) are chemically reactive with gaseous phase pollutants (notably $SO_2$ for soda-lime glass) and the gas solid reaction can effectively remove the pollution. While $SO_2$ reductions have been easily achieved, actual attempts at simultaneously preheating a glass batch and reducing particulate pollution have typically failed.

Hence, there remains a need in the art for a workable arrangement for both preheating a glass batch and simultaneously reducing particulate pollution.

SUMMARY OF THE INVENTION

It is accordingly an object of the invention to provide a method and apparatus for glass manufacture which provides simultaneous pelletized glass batch preheating and pollution reduction of exhaust gases from the glass manufacturing process.

It is another object of the invention to provide a method and apparatus for glass manufacture, as above, which enables the use of pelletized glass batch for filtration of particulate material from exhaust gases.

It is yet another object of the invention to provide a method and apparatus for glass manufacture, as above, which enables easy conversion of a glass batch preheater to use in filtration, and vice versa, thereby enabling shutdown and maintenance of either without substantially affecting glass production.

These objects are achieved by a method for glass manufacture having improved energy efficiency and reduced pollution emissions, wherein first and second beds of pelletized glass batch are provided. Exhaust gases from the melting furnace are conveyed to a preheater which contains the first bed. The exhaust gases pass over the first bed, thereby heating the pelletized glass batch which is thereafter fed to the furnace. The exhaust gases exiting the preheater are then electrostatically ionized and conveyed to a filter which includes the second bed of pelletized glass batch. The ionized exhaust gases are filtered by passing over the second bed, which is electrically polarized to aid in removal of particulate matter from the exhaust gases.

The first bed must move either continuously or intermittently to provide raw material feed to the melting furnace. This movement in turn causes abrasion of the glass batch pellets against each other and causes the formation of particles which are entrained in the exhaust gases as they pass over the first bed. To remove these entrained particles, a separator, such as a cyclone dust collector or equivalent device, may be used to collect these particles prior to ionization of the exhaust gases. The particles resulting from abrasion can be removed by the cyclone because they are much larger than the particulate matter from the melting furnace. 10 Cyclones are unable to remove a significant portion of the latter.

Another feature of the invention is the ability to switch the function of the preheater and the filter. They can be of identical modular construction using identical equipment, such that the movable first bed can be made static, and the static second bed can be made movable. This permits periodic maintenance of either module without interrupting glass production, by temporarily shutting down one module and maintaining use of the other. For environmental purposes, it is preferable to shut down the preheater module and maintain filtration of the exhaust gases. However, preheating can be maintained and filtration temporarily halted where process conditions and local environmental regulations permit.

It is another object of the invention to provide an apparatus for carrying out the method of the invention.

It is yet another object of the invention to provide a module for preheating pelletized glass batch and for filtering exhaust gases from a glass melting furnace. The module can thus function as either a preheater or as a filter. The module includes an electrically conductive modular shell which is grounded. An electrode is positioned in the modular shell and is spaced from the inner wall of the modular shell. When the electrode is connected to a high voltage power source, an electric field is maintained between the electrode and the grounded module shell. The module also includes discharge means for discharging the pelletized glass batch and means for controlling the flow rate of the batch through the module.

BRIEF DESCRIPTION OF THE DRAWINGS

For a full understanding of the invention, the following detailed description should be read with reference to the drawings, wherein.

DETAILED DESCRIPTION OF THE PREFERRED EMBODIMENTS

Figure 1:
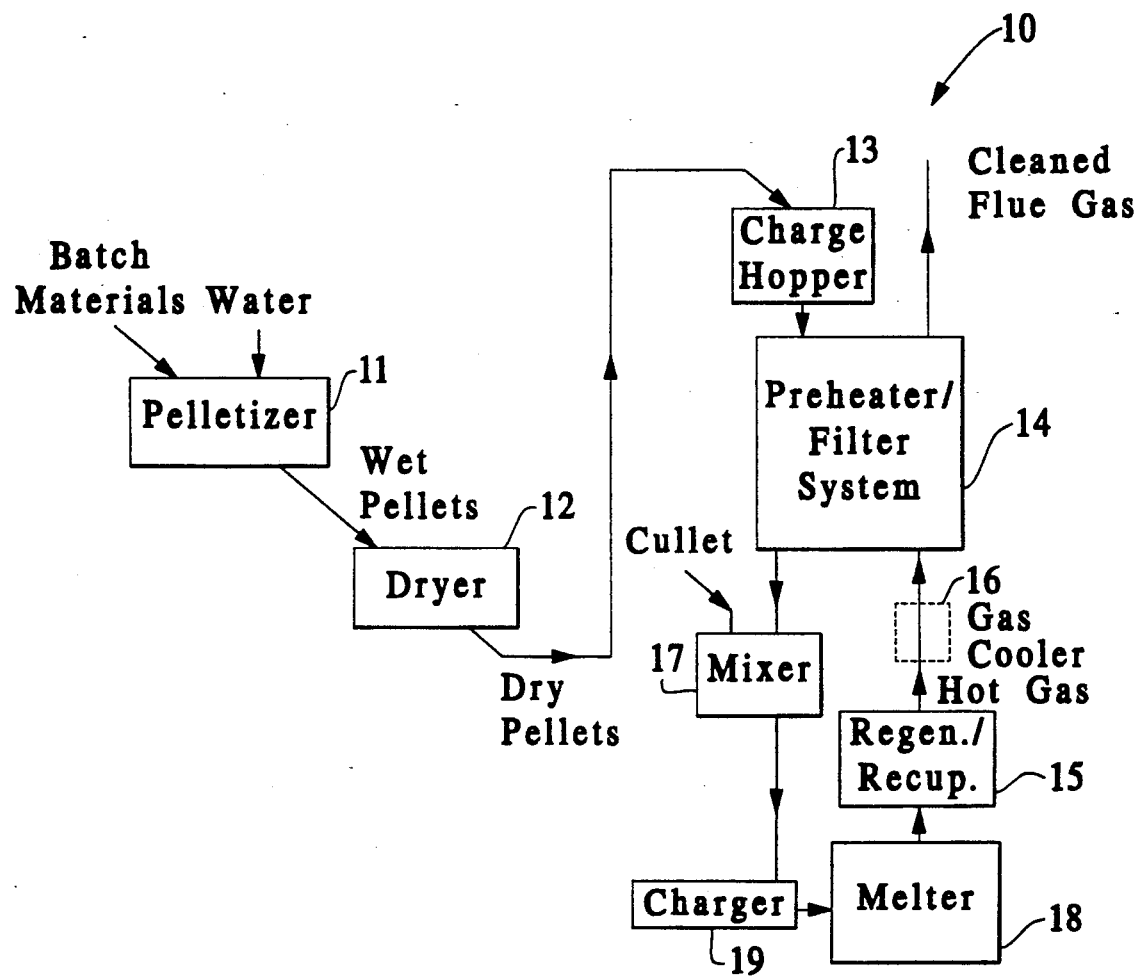
FIG. 1 is an overall process flow diagram of the glass manufacturing process of the invention.
Figure 2:
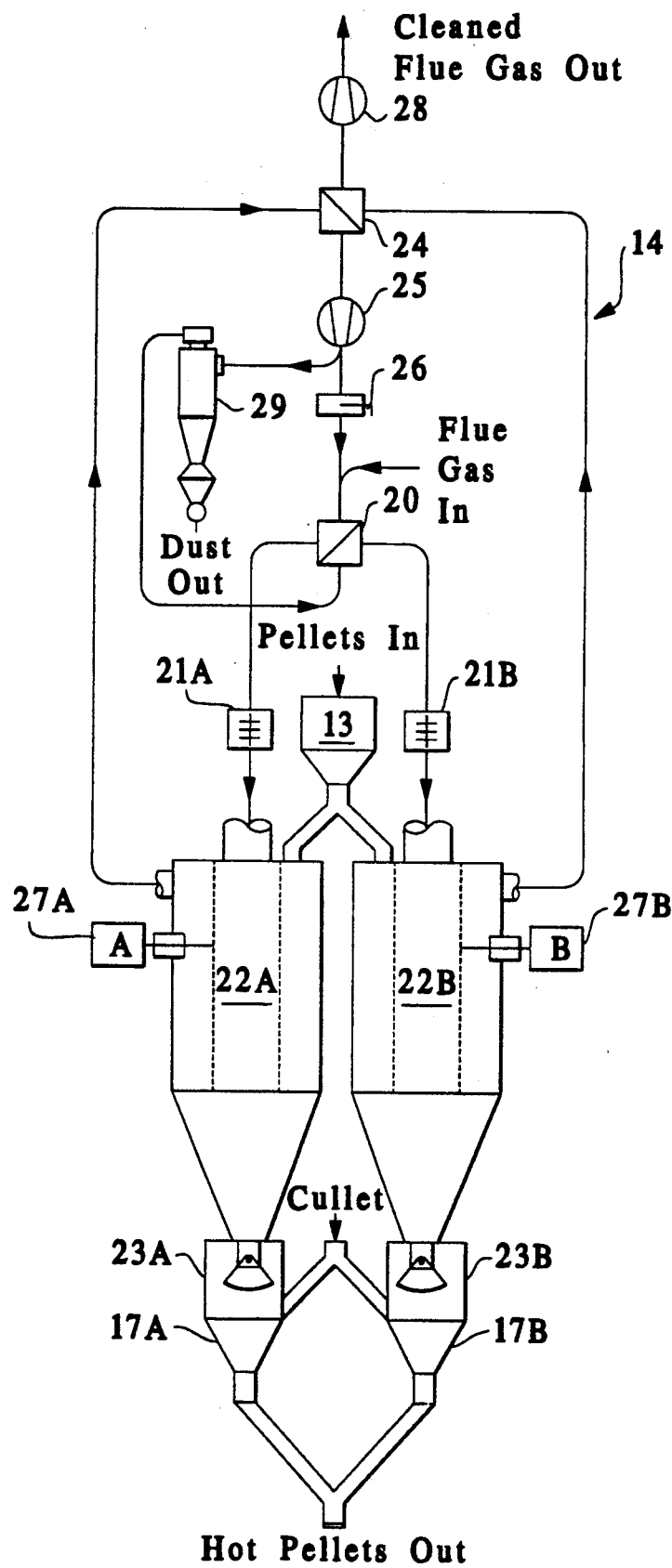
FIG. 2 is a flow diagram for on embodiment of the preheater/filter system of the invention.
Figure 3:
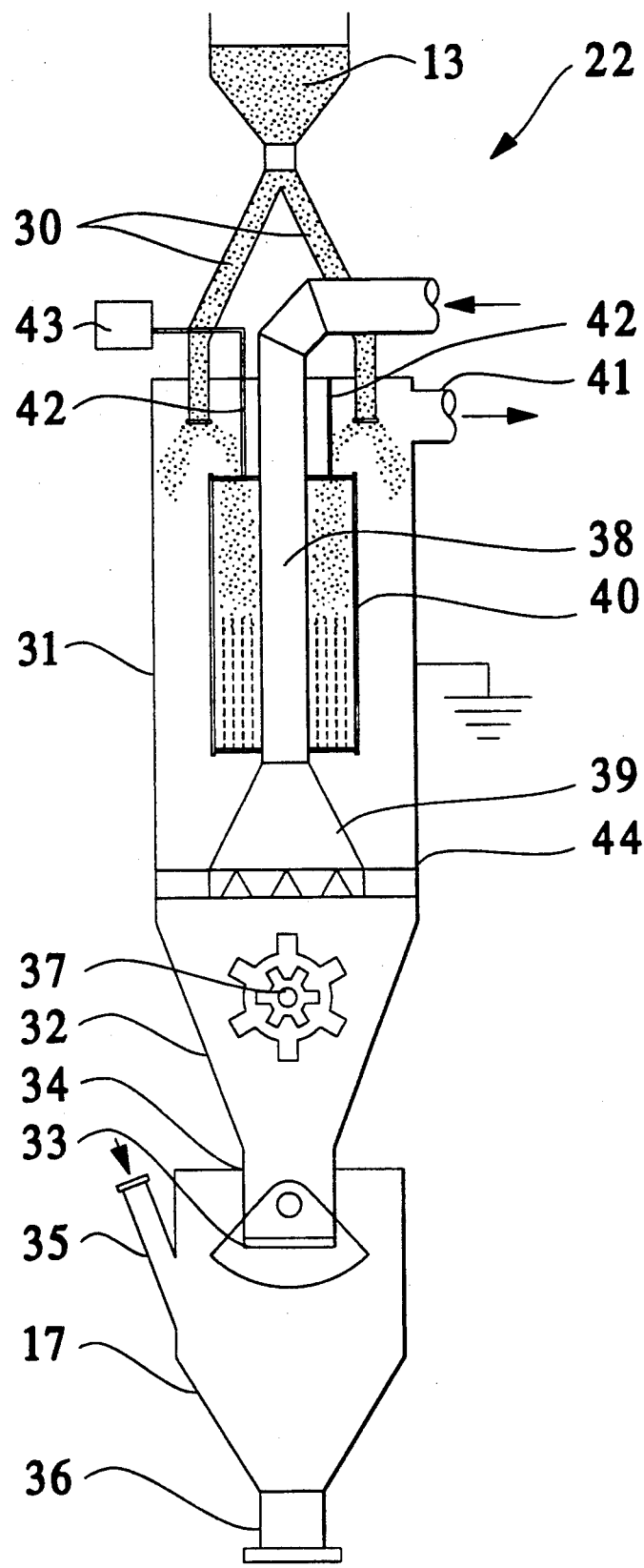
FIG. 3 is a cut away side elevation view of a preferred embodiment of a module forming the preheater/filter system of the invention.

The preferred embodiment of the invention illustrated in FIGS. 1, 2 and 3 is adapted for soda-lime glass, but the invention also encompasses manufacture of other glass types, such as borosilicate glass, etc.

FIG. 1 is an overall process flow diagram for the invention. The glass manufacturing process, indicated generally by the number 10, includes a pelletizer 1. Glass batch materials are directed into the pelletizer 11, which can be constructed of conventional, commercially available equipment. Water is added and pellets are formed by mechanical action. Certain modifications to normal glass batch specifications may be required for pelletizing, such as the addition of a binder (burnt limestone or caustic soda) and/or a requirement of finer than normal batch material sizes. Wet pellets are then directed to a suitable pellet dryer 12 where at least about 50% by weight, and preferably between about 70 and 80% by weight of pellet moisture is removed. The dryer can be of conventional belt type design. Failure to provide dry pellets to the downstream preheater will result in fusion of pellets into a solid mass. The source of heat for the dryer can be glass furnace exhaust gases or air heated by some other means.

During drying, the pellets can fuse at their contact points and mechanical action is required to break them into individual pellets. This is accomplished in normal material handling between the dryer 12 and the charge hopper 13.

Dried pellets are conveyed by tote bins, bucket elevator, or some other suitable means to the charge hopper 13 at the top of preheater/filter system 14. The charge hopper holds pellets and supplies them to the preheater/filter system as required. Cold, dry pellets are moved through the preheater and filter modules (not shown) of the system 14 where they capture pollution from and are heated to the desired temperature by exhaust flue gases from the regenerator or recuperator 15. Hot gases from the regenerator/recuperator 15 may first be cooled by a water evaporative quencher 16 if the temperature at this point is inconsistent with reliable pellet preheater/filter operation. Quencher 16 may also be used to take over cooling of the exhaust gases if the preheater is shut down. Clean gases are exhausted to the atmosphere. Hot pellets are combined with cullet in the mixer 17 and then introduced to the melter 18 via charger 19.

Generally, cullet is added in amounts of between about 10 and about 20% by weight of the total feed to the furnace. Alternatively, the feed may be up to 100% cullet depending on the type of glass produced. One skilled in the art can determine the amount of cullet necessary for a particular glass product.

FIG. 2 illustrates the flow diagram for a preferred embodiment of the preheater/filter system 14. Hot flue gases from the regenerator/recuperator 15 (or possibly the evaporative quencher 16) are mixed with cooled recycled flue gases and directed to the hot diverter valve 20. In the position shown in FIG. 2, these hot gases are directed to ionizer 21A and then subsequently to module 22A, the preheater module. The ionizer 21A includes a high voltage cathode electrode and grounded anode electrode. The ionizer 21A creates negative ions which attach to passing dust particles in the dust stream. Hot gases and electrically charged dust particles pass through the preheater module 22A where they are contacted with the pellets which fill the module.

Cold, dry pellets from charge hopper 13 are continuously moved by gravity through the module 22A as controlled by wiper bar feeder 23A. The feed rate of pellets through the module is ultimately controlled by the batch feed requirements of the melter. A significant portion (typically 60–80%) of the incoming dust particles are deposited onto the pellets and are accordingly removed from the flue gas. Also, at least about 50% by weight and preferably between about 75% and 80% by weight of the $SO_2$ present in the flue gas is removed by contact and chemical reaction with the soda ash in the pellets. Simultaneously, the pellets are heated as they flow through the module 22A with hot pellets being discharged through the wiper bar feeder to the mixer 17A.

Flue gases are cooled while they are in module 22A, but conditions are maintained such that they are not cooled to temperatures below their water or acid dew point, otherwise condensation would occur and interfere with operation of downstream equipment. The temperature of the cooled flue gases is generally from about 100° C. to about 400° C., desirably from about 150° C. to about 300° C., and preferably from about 175° C. to about 225° C.

As the pellets move through the module 22A, coarse dust particles are created by abrasion of the relatively fragile pellets. These particles become entrained in the flue gas exiting the module 22A. In fact, the module can exhibit a negative collection efficiency with regards to total particulate material, the outlet mass flow rate of particulate material exceeding the inlet. However, the inlet particulates are of submicron sizes, while the entrained dust particles generally have a diameter greater than 10 μm and hence are more easily removed by mechanical means such as a cyclone separator, as described hereinafter.

Warm flue gases exiting module 22A are then directed to the warm diverter valve 24 and subsequently to fan 25 which provides the underpressure required for gases to flow through module 22A. From the fan 25, gases are split and a portion as determined by valve 26 are mixed with the inlet hot flue gases and recycled back to module 22A. This recycle gas tempers the hot flue gas so that temperatures are not excessive, and also increases the velocity of gases in module 22A which has the effect of improving heat transfer rate and dust capture efficiency.

The remainder of the flue gases (with a mass flow rate equal to the incoming hot flue gas) are passed through a cyclone dust collector 29 or equivalent device, where the coarse dust particles created by pellet abrasion in module 22A are removed. The purpose of the cyclone 29 is to prevent these coarse dust particles from entering module 22B, the filter module. From the cyclone 29, warm flue gases are directed by hot diverter valve 20 to ionizer 21B and subsequently module 22B, the filter module. Ionizer 21B is identical to ionizer 21A in both construction and function. Its purpose is to ensure that a high percentage of the dust particles entrained in the warm flue gas are electrostatically charged to a high degree. The purpose of module 22B is to remove dust particles with a high efficiency.

Wiper bar feeder valve 23B is closed, preventing the flow of pellets. Module 22B is therefore a static bed with no pellet motion. In addition, the high voltage electrode 27B is energized, which electrically polarizes the pellets in collector module 22B. This dramatically improves the dust reduction efficiency of the module to a level of at least about 50%, desirably up to about 80%, and preferably from about 90% to about 95%, by weight. It should be noted that the duplicate high voltage electrode 27A in preheater module 22A cannot be energized. The electrical conductivity of pellets is strongly dependent on temperature, and at the higher pellet temperatures in this module, high voltage cannot be maintained without excessive electrical power requirements.

Cleaned flue gases exit the filter module 22B and are directed by warm diverter valve 24 to fan 28, which provides underpressure to draw the gases through collector module 22B and cyclone 29. Gases are ultimately discharged from fan 28 to the atmosphere.

The system operates in this way for a period of time determined by the ability of filter module 22B to function effectively. Two criteria may dictate the operating period. First, dust accumulation in the static bed of module 22B will eventually fill the interstices of the pellets and flue gas pressure drop will increase to excessive levels. Second, if the bed remains static for too long a period, the pellets will fuse together and prevent subsequent removal.

To prevent this, at a determined time interval, the functions of the two modules 22A and 22B are effectively reversed according to the following sequence:

Wiper bar control valve 23A is closed, rendering module 22A a static bed. Mixer 17A is provided with sufficient capacity so that batch supply to the melter will not be interrupted.

The system runs this way for a short period of time (about 5–10 minutes), during which any free coarse dust in module 22A is blown off and carried downstream. The hot diverter valve 20 and warm diverter valve 24 are both reversed, directing hot flue gases to module 22B and cooled flue gases to module 22A. Shortly thereafter, wiper bar control valve 23B is opened, allowing pellet flow through module 22B.

After a suitable period of time, when module 22A has cooled enough and module 22B has heated enough, the high voltage electrode 27B is deenergized while simultaneously the high voltage electrode 27A is energized. At this point, the function of the two modules are reversed, with module 22B becoming the preheater module and module 22A becoming the filter module.

A detailed illustration of the module design is made with reference to FIG. 3. Since this module design is descriptive of both modules 22A and 22B, the letter designations "A" and "B" will not be used. Pellets fill the module from charge hopper 13 through infeed pipes 30 which distribute the pellets across the cross-section of the module.

Infeed pipes 30 extend somewhat into the interior of the module. This creates a void region at the top of the module which then serves as a gas outlet plenum for gas exiting the top of the pellet bed. An outlet duct is provided at the side of the module. A sufficient number of infeed pipes are provided to assure good pellet distribution across the cross-section of the module.

The cylindrical module shell 31 contains the pellet bed and functions as a ground electrode. It must be electrically conductive and connected to an electrical ground potential. Discharge cone 32 is connected at the bottom of the shell 31 and functions to provide uniform flow of pellets through the module. Wiper bar control valve 33 is connected to the discharge pipe 34. The angle of deflection determines the pellet flow rate through the module. Pellets fall into mixer 17 where cullet is introduced via cullet infeed pipe 35. The pellet-cullet mixture flows by gravity to the charger 19 via discharge pipe 36. A chunk-breaker 37 is provided in discharge cone 32 to break up any pellet agglomerates which may have formed in the module and which could block pellet flow through the discharge pipe 34 and wiper bar control valve 33.

Flue gas enters the module 22 via inlet pipe 38. Inlet pipe 38 is preferably a conduit concentric with the module shell 31 and which also functions as a ground electrode. In this preferred arrangement, the inlet pipe 38 must be electrically conductive and is connected to an electrical ground potential. The inlet distribution nozzle 39 connects to the bottom end of the inlet pipe and forms a diverging conical nozzle to allow the inlet flue gases to enter the pellet bed at velocities sufficiently low enough to result in only moderate pressure drop.

Flue gas exits the inlet distribution nozzle 39 and flows upward through the pellet bed which fills the region between the module shell 31 and inlet pipe 38. A high voltage electrode 40 is concentrically suspended between the module shell 31 and inlet pipe 38. Electrode 40 is an electrically conductive cylinder and extends from a position somewhat above the upper end o the distribution nozzle 39 to a position somewhat below the bottom edge of the gas outlet pipe 41. The electrode 40 is mechanically supported by insulators 42 and connected to a suitable high voltage power supply 43.

Electrode 40 may comprise an annular member or a plurality of rods forming a concentric ring. A concentric electrode is preferred, since it provides for the greatest area for generation of the electrical field. Pelletized glass batch is provided in the annulus between the electrode 40 and the module shell 31, and in the annulus between the exhaust gas inlet pipe 38 and the electrode 40. Other electrode arrangements are also feasible, such as a single solid electrode arranged either concentrically or asymmetrically within the module shell 31. In these other electrode arrangements, inlet pipe 38 need not be electrically conductive, nor extend into the module shell 31.

Gases enter the pellet bed through the discharge nozzle 39 which provides a very large opening size. The gas incident surface can be further increased by including inverted "V" channels 44 in a spoke-like arrangement between the discharge nozzle 39 and the module shell 31 The incident surface of gas contact with pellets is constantly renewed by the pellet motion through the module. Pellets are discharged through the discharge cone 32, and the walls of the cone are desirably at an angle steep enough to assure uniform pellet flow across the cross-section of the module.

The active region for electrostatic filter operation is defined by the high voltage electrode 40. All of these structures must be electrically conductive in order to function as effective electrodes, the gas inlet tube 38 and module shell 31 being at electrical ground potential. The height of the electrode 40 (and correspondingly this portion of the module) will be determined by both the electrostatic filter operation and the preheat operation. Preferably, this height is between about 1 and about 3 meters. The high voltage electrode is suspended from above via suitable ceramic insulators 42. There should be no other connections from the electrodes to the module, otherwise electrical short circuiting will occur.

The diameter of the module is determined by the desired gas flow throughput in order to maintain optimum gas velocities in the bed. It is conceivable, and within the scope of the invention, to use a series of modules. This may be required if the design criteria for a single module requires a diameter of greater than about 3.5 feet. Generally, the module is sized by specifying a superficial velocity and calculating the square footage of the bed necessary to handle the exhaust gas output from the furnace at the specified velocity. The superficial velocity of exhaust gas through the bed is generally between about 0.2 and about 1.0 m/sec, preferably between about 0.3 and about 0.7 m/sec, and preferably between about 0.4 and 0.6 m/sec.

The wiper bar control valve 23 is periodically opened by a pneumatic operator to a predetermined position to allow pellet flow. The frequency of opening is determined by batch demand to the furnace. The chunkbreaker is activated simultaneously to assure pellet flow.

Use of electrostatic granular bed (EGB) filter technology for capture of particulate matter has been known in the art using gravel as the filtration media. The substitution of pelletized glass batch material for gravel in the filter media, however, was not believed feasible for several reasons.

First, as described previously, pelletized glass batch is very fragile compared to gravel. When subjected to motion through the filter bed, abrasion between pellets creates dust particles. The flue gas flowing through the bed will entrain these particles into the outlet gas stream, thus negating the desired reduction in particulate emissions of the filter. It has been discovered that only a static bed of pelletized glass batch can exhibit the desired particulate emissions reduction.

Second, the electrical conductivity of pelletized glass batch is strongly dependent on temperature. At normal flue gas temperatures for glass furnace exhaust gases, the electrical conductivity of the pellets precludes the economical application of voltage to the bed. Application of this voltage is a fundamental requisite of proper electrostatic granular bed operation. While flue gases could be cooled upstream of the pellet bed in order to achieve the desired operating temperature, this would negate the desired pellet preheating.

Third, the pellet bed must be a moving bed while it is being heated. Since the pellets necessarily include water-soluble binder materials and other chemically reactive components, thermal excursions in a static bed of pellets will result in pellet fusion at the contact points. Subsequently, the pellets would be incapable of being removed from the bed.

Fourth, a pellet bed designed for preheating would be much smaller than an electrostatic pellet bed for particulate capture. While a series combination of a preheater bed followed by a filter bed could be used, their functions could not be interchanged as in the present invention.

Fifth, the art had recognized that particulate capture for pellet beds of reasonable design are quite poor, generally in the range of 30–40%. It has also been discovered that this particulate capture can be dramatically improved by the inclusion of an electrostatic ionizer upstream of the pellet bed. The ionizer functions to impart electrostatic charge onto the dust particles. Electrostatically charged dust particles experience an attractive force to any sufficiently electrically conductive surface. Hot pellets are sufficiently electrically conductive to exhibit such behavior. The effect of such an attractive force is to increase the capture of electrostatically charged dust particles compared to uncharged particles. For glass furnace exhaust gases, the particulate reduction can be improved significantly, from 30–40% up to 70–80% by weight.

Figure 4:
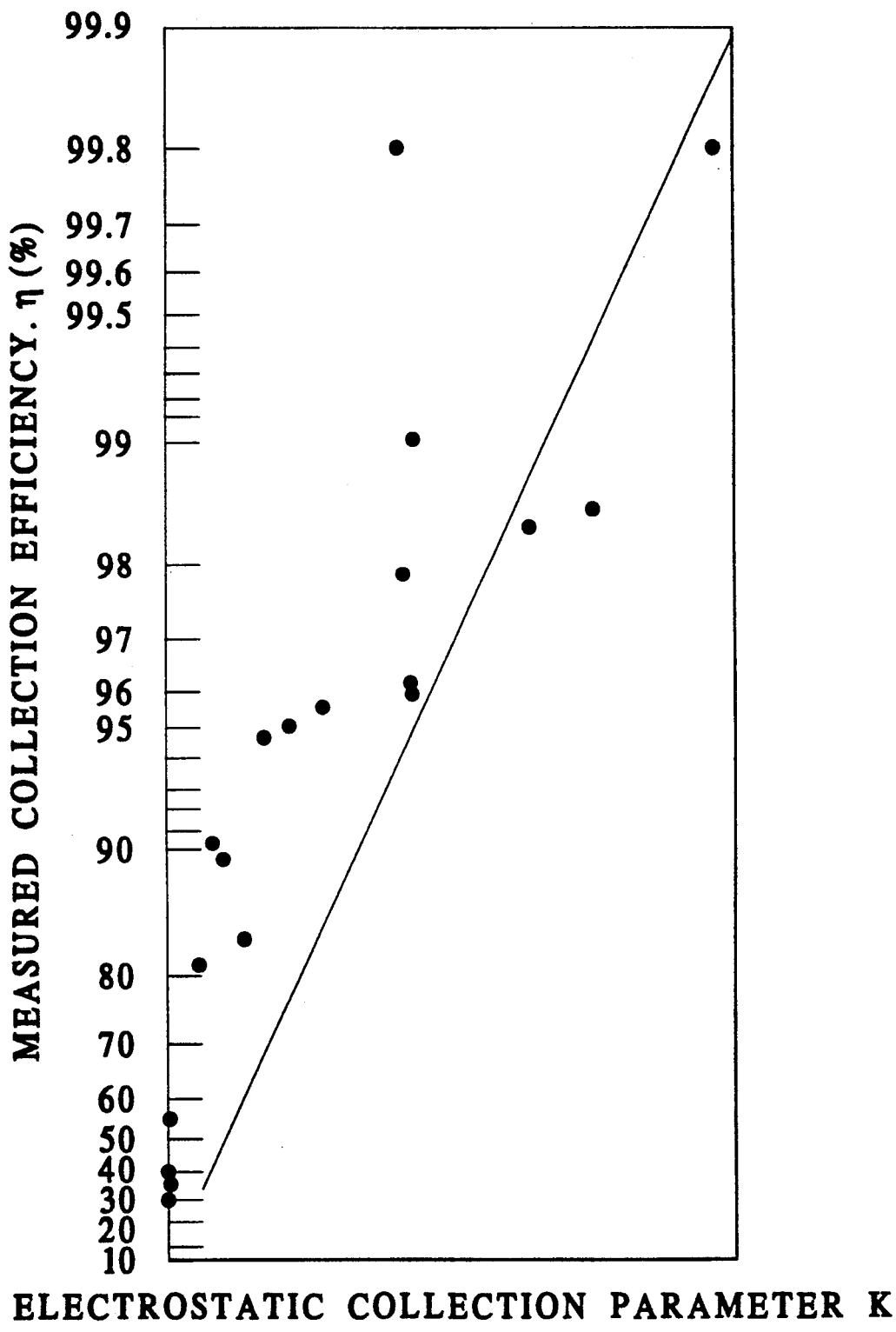
FIG. 4 is a graph of collection efficiency vs. electrostatic collection parameter K.

This becomes an important effect in the design of a preheater/filter system. Optionally, the design particulate reduction efficiency of the system will be at least about 95%. FIG. 4 shows that this efficiency is related to the electrostatic collection parameter K, which in turn (all other parameters being equal) is related to the pellet collection surface area. Pellet surface can be increased only by supplying more pellets, or in other words, a larger piece of equipment. A stand alone electrostatic pellet filter of 95% efficiency would have to be 50% larger than one of 87% efficiency.

To achieve an overall efficiency of 95%, an electrostatic pellet bed filter will require a design efficiency of only 87% if it is preceded by another filter of 63%. Thus substantial savings can be realized by improving the collection efficiency of the preheater bed. In fact, this allows the design to proceed in such a way that the preheater bed and the filter bed can be identical, allowing their functions to be periodically reversed as described above.

Improvement of the particulate capture of the preheater bed can be realized using an upstream ionizer. This ionizer could be of identical design to that incorporated in the electrostatic pellet bed filter, so again the concept of identical equipment holds. Two factors are significant with respect to design of the ionizer. First, effective corona discharge in flue gases (which is essential for proper ionizer operation) can only be maintained up to temperatures of about 450° C. Second, both heat transfer rates and particulate capture rates in the preheater bed are improved with increased gas flow rate. This is exactly the opposite of electrostatic pellet bed filters, where particulate capture rates are improved with decreased gas flow rate.

This design disparity can be reconciled by the implementation of recycled gas flow, where a portion of the cooled gas exhausted from the preheater bed is recycled back to the inlet of the preheater bed. This cooled gas tempers the hot incoming gas to temperatures consistent with effective ionizer operation, and improves the heat transfer and particulate capture rates in the preheater bed.

Recycled gas flow also has the desired effect of allowing control of the preheater bed outlet gas temperature. In cases where gas velocity is low and pellet flow rate is high in the preheater bed, the gases can be cooled to below acid dew point with resulting adverse effects on downstream equipment. By recycling gas, the outlet gas temperature can be maintained above the acid or water dew point.

The aspect of particle entrainment from the preheater bed is a significant problem addressed by the invention. While the preheater bed with upstream ionizer will exhibit some 70% reduction in the incoming submicron particulate, blow-off of coarse particle dust from the bed can reduce the overall efficiency to zero or even to negative efficiencies. However, the entrained dust particles are of a very large size and easy to capture in conventional mechanical devices, such as a cyclone. For this reason, a cyclone collector or equivalent device may be positioned between the preheater bed and the filter bed to capture the coarse dust. With a cyclone, the particulate loading into the filter bed will be some 70% less than the particulate loading into the preheater bed.

The duplicate module arrangement allows for a significant operating feature of the process. Inevitably, such equipment will require internal maintenance at some time during operation of the glass furnace. It is highly desirable to maintain reasonable pollution reduction during any maintenance period. The inclusion of the evaporative quencher in the hot flue gas stream allows the flue gas to be cooled to temperatures consistent with electrostatic pellet bed filter operation even when the preheater function is disabled. Then one of the modules can be completely isolated from the flue gas stream and drained of pellets to allow internal maintenance. The other module can remain in operation as a pollution control system. The pellet preheat function would be lost during this period, but this would be a tolerable sacrifice to production efficiency. Alternatively, the preheat function could be maintained while the filter module is serviced. The latter arrangement may be used in situations where local environmental regulations and/or process conditions permit unfiltered flue gas emissions.

The operation of the modules as a preheater requires exposure to relatively high temperatures, ca. 450° C., exposure to a non-uniform vertical temperature profile, exposure to heating and cooling cycles, and exposure to a relatively high loading of dust, both submicron particulates formed from the glass melt and coarse particle dust blown off from the bed. The primary concern becomes one of maintaining open gas inlet and outlet passages to the pellet bed. The batch material consists of water-soluble species and chemicals which can form eutectic mixtures at relatively low temperatures. These eutectics can form liquid phases which when combined with dust can plug conventional louver structures used in granular bed filters. Because of this a countercurrent shaft preheater/filter design is desirable.

Although the present invention has been described in connection with preferred embodiments of the invention, it will be appreciated by those skilled in the art that additions, substitutions, modifications and deletions not specifically described, may be made without departing from the spirit and scope of the invention as defined in the appended claims.

What is claimed is:

1. An apparatus for preheating pelletized glass batch and for reducing emissions in exhaust gases from a glass melting furnace, comprising:
    (a) a preheater for heating pelletized glass batch, said preheater including a first bed of pelletized glass batch and means for moving said first bed through a preheating section;
    (b) means for conveying a stream of hot exhaust gases from the melting furnace over said first bed, thereby heating the pelletized glass batch of said first bed, said exhaust gases containing particulate material;
    (c) means for feeding said heated pelletized glass batch to the melting furnace;
    (d) means for electrostatically ionizing the exhaust gases exiting said preheater;
    (e) a filter for removing said particulate material from said ionized exhaust gases, including a static second bed of pelletized glass batch and means for electrically polarizing the pelletized glass batch in said second bed;
    (f) means for passing the ionized exhaust gas over said static second bed, thereby substantially reducing the amount of said particulate material in said ionized exhaust gas; and
    (g) means for periodically converting said preheater to a filter and said filter to a preheater, thereby reversing the functions of said first and second beds in said apparatus.

2. An apparatus according to claim 1, including means for electrostatically ionizing the exhaust gas from said melting furnace prior to passing said exhaust gas over said first bed.

3. An apparatus according to claim 1, further including particle separation means for removing entrained particles from the exhaust gases exiting the first bed prior to ionizing said exhaust gas.

4. An apparatus according to claim 2, wherein said particle separation means comprises a cyclone dust collector.

5. An apparatus according to claim 1, wherein said preheater and said filter comprise substantially identical modules.

6. An apparatus according to claim 1, including means for recycling a portion of the exhaust gas from said first bed to said stream of exhaust gas passing over said first bed.

7. An apparatus according to claim 1, including means for moving said first bed continuously.

8. A module for preheating a pelletized glass batch and for filtering exhaust gases from a glass melting furnace, comprising:
    (a) an annular electrically conductive module shell, including means for connection to an electrical ground potential;
    (b) an exhaust gas inlet pipe connected to an electrical ground potential and positioned in said module shell and extending along the length of said module shell;
    (c) an electrode positioned in said module shell between said inlet pipe and ana inner wall of said module shell and spaced from both the inner wall of said module shell and an outer wall of said inlet pipe, said electrode including means for connection to a high voltage power supply, wherein an electric field is generated between said electrode and said module shell and between said electrode and said inlet pipe when voltage is applied to said electrode;
    (d) means for feeding pelletized glass batch to said module and for forming a bed thereof in said electric field;
    (e) means for providing an upward flow of furnace exhaust gases between said electrode and said module shell, and between said electrode and said inlet pipe, said upward flow means including said inlet pipe and a distribution nozzle connected to said inlet pipe for distribution of exhaust gases upward from said nozzle;
    (f) discharge means connected to one end of said module shell for discharging pelletized glass batch from said module, including means for controlling the flow rate of said pelletized glass batch through said module.

9. A module according to claim 8, wherein said exhaust gas inlet pipe and said electrode are concentric with said module shell, and wherein said means for feeding pelletized glass batch to said module includes means for forming said bed between said electrode and said exhaust gas inlet pipe.

10. A module according to claim 9, wherein said electrode comprises an annulus.

11. A module according to claim 9, wherein said electrode comprises a plurality of spaced rods.

12. A module according to claim 8, wherein said pelletized glass batch discharge means includes means for maintaining a static bed of pelletized glass batch in said module.

* * * * *